(12) United States Patent
Buccellato et al.

(10) Patent No.: US 6,966,660 B1
(45) Date of Patent: Nov. 22, 2005

(54) ARTICLE EXHIBITING DRY AND WET RETROREFLECTIVITY

(75) Inventors: Gina M. Buccellato, Eagan, MN (US); Thomas P. Hedblom, Eagan, MN (US); John L. Vandenberg, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/418,730

(22) Filed: Oct. 15, 1999

(51) Int. Cl.$^7$ ............................................. G02B 5/128
(52) U.S. Cl. ..................... 359/540; 359/534; 359/536; 359/538; 359/547; 359/900; 428/148; 428/325; 404/14
(58) Field of Search ................ 359/534–542, 359/546, 547, 551–553, 900; 428/148, 325, 428/143; 404/14, 17

(56) References Cited

U.S. PATENT DOCUMENTS

| | | |
|---|---|---|
| 2,043,414 A | 6/1936 | Korff |
| 2,326,634 A | 8/1943 | Gebhard et al. |
| 2,354,018 A | 7/1944 | Heltzer et al. |
| 2,354,048 A | 7/1944 | Heltzer et al. |
| 2,407,680 A | 9/1946 | Palmquist et al. |
| 2,440,584 A | 4/1948 | Heltzer et al. |
| 2,592,882 A | 4/1952 | Fisher et al. |
| 3,043,196 A | 7/1962 | Palmquist et al |
| 3,175,935 A | 3/1965 | Vanstrum |
| 3,252,376 A | 5/1966 | De Vries |
| 3,254,563 A | 6/1966 | De Vries et al. |
| 3,274,888 A | 9/1966 | Vanstrum et al. |
| 3,413,058 A | 11/1968 | Tung et al. |
| 3,418,896 A | 12/1968 | Rideout |
| 3,486,952 A | 12/1969 | Vanstrum et al. |
| 3,556,637 A | 1/1971 | Palmquist |
| 3,702,213 A | 11/1972 | Schwab |
| 3,709,706 A | 1/1973 | Sowman et al. |
| 3,795,435 A | 3/1974 | Schwab |
| 3,849,351 A | 11/1974 | Jorgensen |
| 3,891,451 A | 6/1975 | Okazaki et al. ................ 106/30 |
| 3,894,791 A | 7/1975 | Eigenmann |
| 3,935,158 A | 1/1976 | Watanabe ................. 260/42.21 |
| 3,958,891 A | 5/1976 | Eigenmann |
| 4,030,958 A | 6/1977 | Stenemann |
| 4,055,377 A | 10/1977 | Erickson et al. |
| 4,072,403 A | 2/1978 | Eigenmann |
| 4,082,426 A | 4/1978 | Brown |
| 4,104,102 A | 8/1978 | Eagon et al. |
| 4,117,192 A | 9/1978 | Jorgensen |
| 4,145,112 A | 3/1979 | Crone et al. |
| 4,166,147 A | 8/1979 | Lange et al. |
| 4,203,878 A | 5/1980 | Bauer ...................... 260/18 EP |
| 4,226,658 A | 10/1980 | Carlson et al. |
| 4,248,932 A | 2/1981 | Tung et al. .................. 428/325 |

(Continued)

FOREIGN PATENT DOCUMENTS

CN 86202906 U 8/1987

(Continued)

*Primary Examiner*—James Phan
(74) *Attorney, Agent, or Firm*—Carolyn A. Fischer (57) ABSTRACT

A exposed-lens retroreflective article exhibiting retroreflection under dry and wet conditions is provided. The inventive article comprises a first set of optical elements having a first reflective layer disposed on the embedded portion of the elements. The first set contributes mainly to dry retroreflection. The article further comprises a second set of optical elements having a second reflective layer behind a spacing layer. The second set contributes mainly to wet retroreflection. In one embodiment, the first and second sets of optical elements have substantially the same average diameters, refractive index, and density.

22 Claims, 2 Drawing Sheets

U.S. PATENT DOCUMENTS

| | | | |
|---|---|---|---|
| 4,367,920 A | 1/1983 | Tung et al. | |
| 4,388,359 A | 6/1983 | Ethen et al. | |
| 4,411,553 A | 10/1983 | Eigenmann | |
| 4,490,432 A | 12/1984 | Jordan | |
| 4,505,967 A | 3/1985 | Bailey | 428/164 |
| 4,511,210 A | 4/1985 | Tung et al. | |
| 4,564,556 A | 1/1986 | Lange | 428/325 |
| 4,569,857 A | 2/1986 | Tung et al. | |
| 4,618,525 A | 10/1986 | Chamberlain et al. | 428/209 |
| 4,648,932 A | 3/1987 | Bailey | |
| 4,652,172 A | 3/1987 | Eigenmann | |
| 4,664,966 A | 5/1987 | Bailey et al. | |
| 4,678,695 A | 7/1987 | Tung et al. | 428/120 |
| 4,681,401 A | 7/1987 | Wyckoff | |
| 4,682,852 A | 7/1987 | Weber | |
| 4,758,469 A | 7/1988 | Lange | |
| 4,767,659 A | 8/1988 | Bailey et al. | |
| 4,772,511 A | 9/1988 | Wood et al. | 428/325 |
| 4,875,798 A | 10/1989 | May | |
| 4,937,127 A | 6/1990 | Haenggi et al. | 428/148 |
| 4,950,525 A | 8/1990 | Bailey | |
| 4,969,713 A | 11/1990 | Wyckoff | |
| 4,983,458 A | 1/1991 | Dejaiffe | |
| 4,988,541 A | 1/1991 | Hedblom | |
| 4,988,555 A | 1/1991 | Hedblom | 428/172 |
| 5,008,142 A | 4/1991 | Wilson et al. | |
| 5,053,253 A | 10/1991 | Haenggi et al. | 427/204 |
| 5,077,117 A | 12/1991 | Harper et al. | 428/143 |
| 5,087,148 A | 2/1992 | Wyckoff | |
| 5,094,902 A | 3/1992 | Haenggi et al. | 428/150 |
| 5,108,218 A | 4/1992 | Wyckoff | |
| 5,114,193 A | 5/1992 | Nass | |
| 5,124,178 A | 6/1992 | Haenggi et al. | 427/204 |
| 5,139,590 A | 8/1992 | Wyckoff | |
| 5,207,852 A | 5/1993 | Lightle et al. | 156/230 |
| 5,227,221 A | 7/1993 | Hedblom | |
| 5,268,789 A | 12/1993 | Bradshaw | |
| 5,316,406 A | 5/1994 | Wyckoff | |
| 5,316,838 A | 5/1994 | Crandall et al. | 428/283 |
| 5,417,515 A | 5/1995 | Hachey et al. | 404/15 |
| 5,478,596 A | 12/1995 | Gurney | 427/137 |
| 5,557,461 A | 9/1996 | Wyckoff | |
| 5,571,362 A | 11/1996 | Hachey et al. | |
| 5,620,775 A | 4/1997 | LaPerre | 428/149 |
| 5,643,655 A | 7/1997 | Passarino | |
| 5,667,334 A | 9/1997 | Boyce | |
| 5,667,335 A | 9/1997 | Khieu et al. | |
| 5,670,227 A | 9/1997 | Hedblom et al. | |
| 5,676,488 A | 10/1997 | Hedblom | |
| 5,750,191 A | 5/1998 | Hachey | |
| 5,759,928 A | 6/1998 | Harper | |
| 5,774,265 A | 6/1998 | Mathers et al. | |
| 5,777,791 A | 7/1998 | Hedblom | 359/536 |
| 5,812,317 A | 9/1998 | Billingsley et al. | 359/536 |
| 5,822,120 A | 10/1998 | Palazzotto et al. | |
| 5,917,652 A | 6/1999 | Mathers et al. | |
| 6,247,818 B1 * | 6/2001 | Hedblom et al. | 359/540 |
| 6,479,132 B2 * | 11/2002 | Hedblom et al. | 428/143 |

FOREIGN PATENT DOCUMENTS

| | | | |
|---|---|---|---|
| EP | 0322671 A3 | 7/1989 | |
| EP | 0683403 A2 | 11/1995 | |
| GB | 1036392 | 7/1966 | |
| GB | 2255312 | 11/1992 | G02B 5/128 |
| WO | WO 97/28470 | 2/1996 | |
| WO | WO 97/01676 | 6/1996 | |
| WO | WO 97/01675 | 1/1997 | |
| WO | WO 97/01677 | 1/1997 | |

* cited by examiner

ARTICLE EXHIBITING DRY AND WET RETROREFLECTIVITY

The present invention pertains to retroreflective articles that exhibit retroreflective brightness under dry and wet conditions. In particular, the invention relates to pavement markings that use a combination of optical elements, a first set of optical elements that contributes substantially to dry retroreflection and a second set that contributes substantially to wet retroreflection.

BACKGROUND

Retroreflective articles have the ability to return substantial quantities of incident light, which otherwise would be reflected elsewhere, back towards the light source. This ability has led to widespread use of retroreflective articles in a variety of applications relating to traffic and personal safety. For example, in the traffic safety area, retroreflective articles, such as pavement markings, have been used to help guide motorists.

Many flat pavement markings typically rely on an exposed-lens retroreflective optical system having light transmissible microspheres partially embedded in a binder layer containing reflective pigment particles such as titanium dioxide ($TiO_2$) or lead chromate ($PbCrO_4$). A portion of the microsphere that is not embedded in the binder is usually exposed to the atmosphere. In use, light from a vehicle's headlight enters the microsphere, is refracted towards the reflective pigment, and a portion is reflected by the pigment to return generally in the direction from which the light came. It is generally known in the art that the retroreflective performance of an exposed-lens flat pavement marking diminishes substantially when the microspheres becomes wet. This reduction arises because when the optical elements become wetted or covered with water, e.g. from rainwater, the ratio of the refractive indices at the elements' exposed-lens surface changes thereby affecting the elements' ability to gather incident light. Thus, some skilled in the art have pursued different methods to make articles exhibiting retroreflectivity under dry and wet conditions.

One method involves using a patterned pavement making, as described, for example, in U.S. Pat. No. 4,988,555 (Hedblom). In another method, U.S. Pat. No. 5,777,791 (Hedblom) describes an exposed-lens patterned pavement marking that exhibits retroreflectivity under dry and wet conditions by using a combination of microspheres having different refractive indices. A first type of microspheres, having a refractive index of about 1.9 to 2.0, contributes to retroreflectivity under dry conditions (referred to as "dry retroreflectivity"), while a second type of microspheres, having a refractive index of about 2.2 to 2.3, contributes to retroreflectivity under wet conditions (referred to as "wet retroreflectivity"). Others skilled in the art have also used combinations of microspheres with different refractive index to achieve dry and wet retroreflectivity. See U.S. Pat. No. 3,043,196 (Palmquist); U.S. Pat. No. 5,207,852 (Lightle et al.); U.S. Pat. No. 5,316,838 (Crandall et al.); and U.S. Pat. No. 5,417,515 (Hachey et al.).

Assignee's pending U.S. patent application Ser. No. 09/175,523 filed on Oct. 20, 1998, discloses pavement marking articles having enhanced retroreflectivity under wet conditions. The pavement marking has a monolayer of exposed lens optical elements that have an embedded surface, a spacing layer having two major surfaces, the first major surface in contact with the embedded surface of the optical elements, and a reflective layer on the second major surface of the spacing layer. A related case is U.S. patent application Ser. No. 09/175,857 filed on Oct. 20, 1998, which discloses a method of making a retroreflective element.

Figure 3:
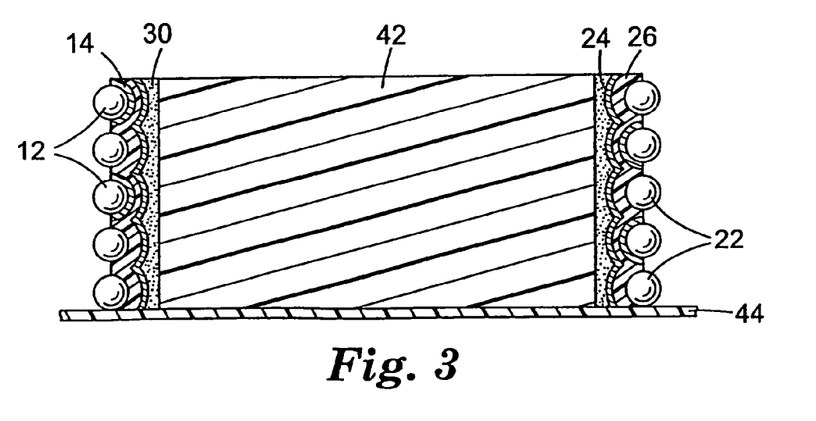
FIG. 3 is a cross-sectional view of the pavement marking taken along line 3—3 of FIG. 2.

U.S. Pat. No. 2,354,018 (Heltzer et al.) discloses an exposed-lens light reflector sheet useful for making traffic signs or markers. In one embodiment, the reflector comprises transparent glass beads partially embedded in a pigmented bead-bonding coat, and a pigmented sizing film lying next to the most embedded portion of the glass beads and also in contact with the bead-bond. In another embodiment, the reflector sheet comprises, glass beads partially embedded in a bead-bond coat, a transparent spacing layer lying next to the most embedded portion of the glass beads and also in contact with the bead-bond, and a reflector (pigmented or aluminum foil) sizing coat lying next to the spacing layer. As shown in FIG. 3, the spacing layer is a substantially flat layer. The article may be very useful where incident light from a vehicle headlight strikes almost perpendicular to the surface of the sheeting. The article may not be as useful, however, where incident light enters the article at a high entrance angle because the spacing layer is not cupped around the embedded portion of the glass beads.

U.S. Pat. No. 5,812,317 (Billingsley et al.) discloses an exposed-lens retroreflective article exhibiting improved laundering durability useful, in one application, as reflective fabrics for clothing. The article has, in sequence, a layer of microspheres, a light-transmissible polymeric intermediate layer, a metal reflective layer, and a polymeric binder layer. By placing an intermediate layer between the microspheres and the reflective layer, enhanced laundering durability is provided without having substantial adverse affects on the retroreflective articles' optical performance under dry conditions, as measured according to ASTM E 810-93b. See column 3, lines 11 to 16 and column 8, line 18 to 19. The intermediate layer is preferably continuous, but there may be some very small regions—particularly at the most embedded portion of the microspheres—where the intermediate layer is discontinuous, i.e., its thickness is zero or approaches zero. See column 4, line 64.

Although the preceding technology is very useful in their applications, there still exists a need for a retroreflective article, in particular, an exposed-lens pavement marking, that exhibits dry and wet retroreflectivity.

SUMMARY

The present invention provides a new and improved retroreflective article useful for retroreflection under both dry and wet conditions. Unlike known retroreflective articles, the present invention provides a combination of exposed-lens optical elements having reflective layers positioned so that the article exhibits dry and wet retroreflection.

In brief summary, the retroreflective article, e.g. a pavement marking, comprises or consists essentially of (a) a layer of optical elements comprising: (i) a first set of exposed-lens optical elements having an embedded portion and a first reflective layer disposed on the embedded portion; and (ii) a second set of exposed-lens optical elements having an embedded portion; (b) a light-transmissible spacing layer having first and second surfaces, the first surface disposed adjacent to the embedded portion of the first and second set of optical elements; and (c) a second reflective layer disposed on the second surface of the spacing layer.

An advantage of the present invention is that the article retroreflects incident light under wet conditions, e.g. during rainy conditions, as well as under dry conditions. The refractive index of the first set of optical elements is chosen so that when a first reflective layer lies nearly immediately adjacent to the embedded portion (commonly referred to as the "back surface") of the optical elements, the first set contributes substantially to dry retroreflection and a minor amount to wet retroreflection. The second set of optical elements, having a reflective layer disposed behind the spacing layer, contributes substantially to wet retroreflection and a minor amount to dry retroreflection.

Another advantage of the present invention is that it can result in easy handling of the optical elements. In one embodiment of the invention, the optical elements have similar average diameters and specific gravity thereby minimizing segregation of the first set and second set of optical elements during processing and minimizing any settling of the optical elements during storage. The term "similar" does not mean that the average diameters and specific gravity of the first and second sets of optical elements have to be identical. In this way, the two types of optical elements can be distributed evenly throughout a retroreflective article thereby minimizing localized regions of one type of optical elements. An even distribution of the different sets of optical elements is desirable because the entire article, and not just localized regions, retroreflects under dry or under wet conditions.

In another aspect of the invention, it may be desirable to have regions of one type of elements. For example, it may be desirable to have the first and/or second set of optical elements applied selectively so as to produce graphics or indicia Under wet conditions, the graphics or indicia communicates information to the motorists. If the spacing layer is colored, e.g. colored red, then the graphics or indicia would be colored to warn the motorists.

The retroreflective articles of the present invention have several useful applications. For example, in a pavement marking application, the articles can be attached to a patterned base sheet. In another example, the article can also be attached to a core material to yield a retroreflective element.

BRIEF DESCRIPTION OF THE DRAWINGS

The invention is further explained with reference to the drawings, wherein.

These figures are idealized, are not to scale, and intended to be merely illustrative and non-limiting.

Definitions

As used in this document in reference to the invention:

"Contributes substantially to dry retroreflection" means that the optical elements preferably contributes at least 50% of the article's dry retroreflection, more preferably at least 75%, and most preferably at least 90%. Similarly, "contributes substantially to wet retroreflection" means that the optical elements contributes at least 50% of the article's wet retroreflection, more preferably at least 75%, and most preferably at least 90%.

"Exposed-lens optical elements" mean microspheres, e.g. glass beads or ceramic beads, having a portion of its total surface exposed to ambient conditions, such as the atmosphere. The exposed portion gathers incident light. The optical elements also have a portion of its total surface area in contact with a material (such as, a spacing layer or a reflective layer), that is referred to as the embedded portion.

A "retroreflective element" is one that comprises a core layer and is described in detail below. It should be contrasted with "optical elements" which are the microspheres that act as lens to gather incident light. Retroreflective elements use a plurality of optical elements.

A material is "light transmissible" when it has a. 70% or greater transparency to light of the desired wavelengths, more preferably 80% or greater, and most preferably, 90% or greater.

DETAILED DESCRIPTION

Figure 1:
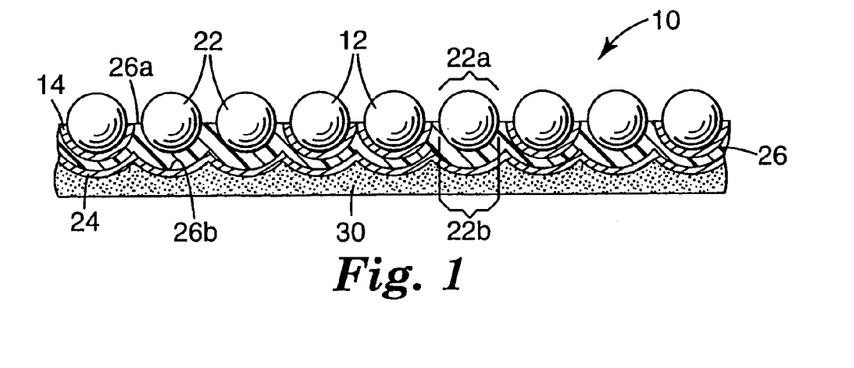
FIG. 1 is a cross-sectional view of a retroreflective article 10 in accordance with the invention.

In the figures, like numbers indicate like materials. FIG. 1 shows an illustrative embodiment of the invention where article 10 has a first set of optical elements 12 and a second set of optical elements 22, both sets being partially embedded in a spacing layer 26. The elements have an exposed portion and an embedded portion, conveniently shown as 22a and 22b respectively for the second set of optical elements. The first set of optical elements have a first reflective layer 14 disposed on its embedded portion. The spacing layer with its first surface 26a is disposed on the back surface of the optical elements 12 and 22. A second reflective layer 24 is disposed on the second surface 26b of the spacing layer. An adhesive layer 30 is disposed on the second reflective layer for easy attachment to a substrate. The second reflective layer 24 does not provide any additional retroreflection to the first set of optical elements 12. In use, the first set of optical elements contributes substantially to the dry retroreflection while the second set of optical elements contributes substantially to wet retroreflection, the latter situation occurring when water is present over the article.

Figure 2:
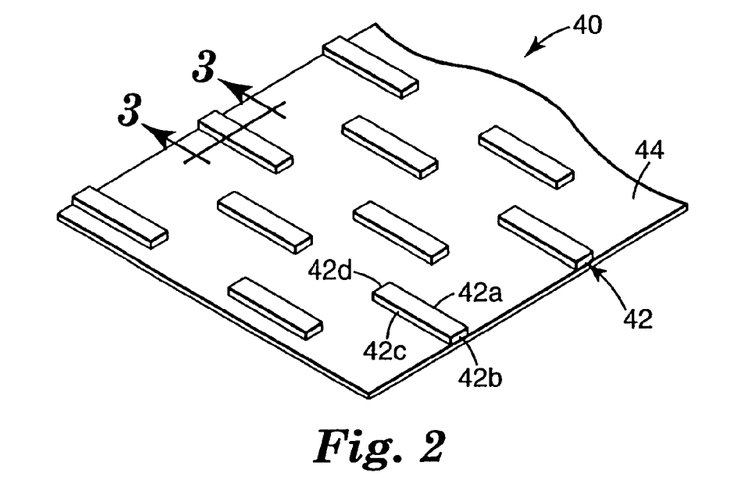
FIG. 2 is a top view of a pavement marking 40 in accordance with the invention.

FIG. 2 depicts a top view of a pavement marking 40 having a multiplicity of projections 42. As shown, each projection has four side surfaces, 42a, 42b, 42c, and 42d. The side surfaces can be nearly vertical to the top surface of a binder layer 44. The binder layer is typically about 0.1 to 1 millimeter in height. Lying below the binder layer is typically the road surface or a premix material with an adhesive layer, the combination sometimes referred to as a "base sheet." Although rectangular projections are shown, projections of other shapes may be used. In a preferred embodiment, the projections are not an integrals art of the binder layer or the base sheet, if used. That is, the projections are not formed at the same time as the base sheet or binder layer. Useful materials for binder layers include both thermoset and thermoplastic polymeric materials, such as urethanes, epoxies, alkyds, acrylics, acid olefin copolymers, such as ethylene/methacrylic acid, polyvinyl chloride/polyvinyl acetate copolymers, etc.

Preferably, the projections are spaced apart so as to minimize vehicle headlight shadowing effects one projection may have on another projection. On selected side surfaces of the projections (e.g., surfaces 42a and 42c), the inventive article 10 of FIG. 1 can be applied. The pavement marking 40 would typically be applied to a roadway surface so as to expose as much of the side surface areas of the projections 42 as possible.

FIG. 3 is a cross section of one of the projections shown in FIG. 2 taken along line 3—3. The projection 42 is typically about 1 to 5 millimeters in height, as measured from the top surface binder layer 44. Preferably, the binder layer 44 is pigmented to provide color and contains a plurality of exposed-lens optical elements.

Illustrative samples of common colorants that can be used in the binder and/or optical elements include, but are not limited to, Titanium Dioxide CI 77891 Pigment White 6 (DuPont, Wilmington, Del.), Chrome Yellow CI 77603 Pigment Yellow 34 (Cookson Pigments, Newark, N.J.), Arylide Yellow CI 11741 Pigment Yellow 74 (Hoechst Celanese, Charlotte, N.C.), Arylide Yellow CI 11740 Pigment Yellow 65 (Hoechst Celanese, Charlotte, N.C.), Diarylide Yellow HR CI 21108 Pigment Yellow 83 (Hoechst Celanese, Charlotte, N.C.), Naphthol Red CI 12475 Pigment Red 170 (Hoechst Celanese, Charlotte, N.C.), IRGAZINE™ 3RLTN PY 110 CI Pigment Yellow (Ciba Specialty Chemical Corp., Tarrytown, N.Y.), Benzimidazolone H2G CI Pigment Yellow 120 (Hoechst Celanese, Charlotte, N.C.), and Isoindolinone CI Pigment Yellow 139 (Bayer Corp., Pittsburgh, Pa.).

Although not shown in FIG. 2 or 3, skid-resistant particles may be applied to the binder 44 and/or the top of surface of projections 42. Illustrative examples of particularly useful skid-resistant particles include those disclosed in U.S. Pat. Nos. 5,124,178; 5,094,902; 4,937,127; and 5,053,253. Skid-resistant particles may also be embedded in a retroreflective element, or embedded in a road-binder, as discussed below. Generally, skid-resistant particles are randomly sprinkled and become embedded in the binder material while it is in a softened state.

Another embodiment of the present invention is a retroreflective element attached to a patterned base sheet or partially embedded in a road binder. As used herein, a "patterned base sheet" is one that has projections, like those shown in FIG. 2, where the projections do not necessarily have to be an integral part of the binder 44. The patterned base sheet can also be integral protuberances as disclosed in U.S. Pat. No. 4,998,555 (Hedblom).

In brief summary, the retroreflective elements comprise: (a) a layer of optical elements comprising (i) a first set of exposed-lens optical elements having an embedded portion and a first reflective layer disposed on the embedded portion; and (ii) a second set of exposed-lens optical elements having an embedded portion; (b) a light-transmissible spacing layer having first and second surfaces, the first surface disposed adjacent to the embedded portion of the first and second set of optical elements; (c) a second reflective layer disposed on the second surface of the spacing layer; and (d) a core layer.

Figure 5:
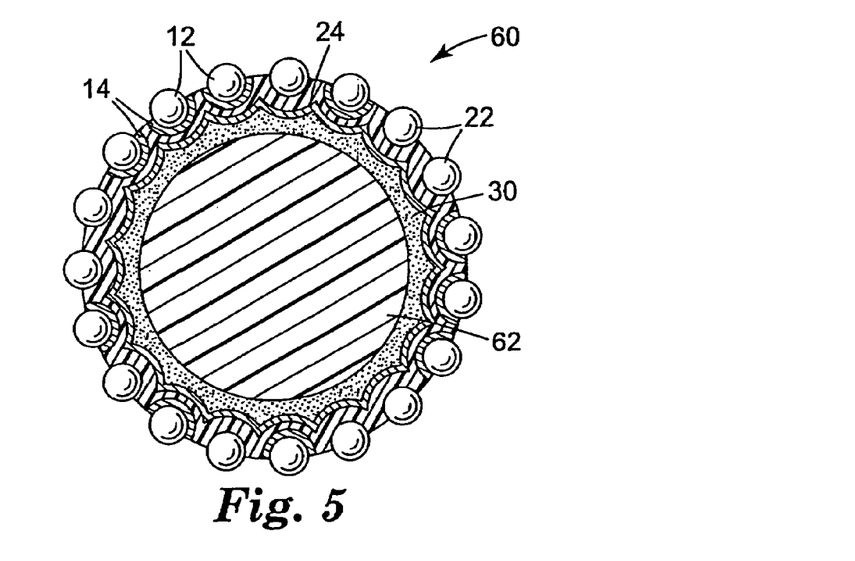
FIG. 5 is a cross-sectional view of a retroreflective element 60 in accordance with the invention.

FIG. 5 shows a retroreflective element 60 having a core layer 62. The article 10 of FIG. 1 has been attached to the core such that the adhesive layer 30 is in contact with the core. It is within the scope of this invention, however, to use prime layers or tie layers on the surface of the core layer.

Suitable core layer material includes polymeric materials, both thermoplastic and thermoset materials and mixtures thereof. Particular examples of suitable material can be readily selected by those skilled in the art. Core layer materials can be selected from a wide range of thermoplastic materials. For example, non-crosslinked elastomer precursors (e.g., nitrile rubber formulations), ethylene-vinylacetate copolymers, polyesters, polyvinylacetate, polyurethanes, polyureas, acrylic resins, methacrylic resins, ethylene-acrylate/methacrylate copolymers, ethylene-acrylic acid/methacrylic acid copolymers, and the like are useful. The core layer material can be comprised of one or more thermoplastic materials.

Illustrative examples of thermoset materials useful for the core layer include amino resins, thermosetting acrylic resins, thermosetting methacrylic resins, polyester resins, drying oils, alkyd resins, epoxy and phenolic resins, polyurethanes based on isocyanates, polyureas based on isocyanates, and the like. Such compositions are described in detail in Organic Coatings: Science and Technology, Volume I: Film Formation, Components, and Appearance, Zeno W. Wicks, Jr., Frank N. Jones and S. Peter Pappas, John Wiley & Sons, Inc., New York, 1992.

The presently preferred dimensions of the retroreflective elements are approximately about 1.0 to about 5.0 millimeters (about 0.40 to about 0.125 inch) in height, about 0.50 to about 1.0 centimeter (about 3/16 inch to about 3/8 inch) in width, and about 0.50 to about 10 centimeter (about 3/16 to about 4 inches) in length. The retroreflective elements may be any shape. However, the shape typically is rectangular or square.

The retroreflective elements may be attached to either a flat or a patterned base sheet. As used herein a "flat base sheet" is one that has no protuberances or projections on one of its major surface. As described above, the patterned base sheet has projections or integral protuberances and the retroreflective elements preferably are adhered to the "vertical" (i.e., generally up-right as generally shown in FIG. 2 as surfaces 42a, 42b, 42c, and 42d) surfaces of the projections, where they provide the most efficient retroreflection. However, the retroreflective elements may be attached to the top surface of the top layer of the patterned base sheet, if desired.

The retroreflective elements can be attached to a base sheet using a binder material. Suitable binder materials include, but are not limited to polyurethanes, polyureas, epoxy resins, polyamides, polyesters, and mixtures thereof and to those disclosed in U.S. Pat. Nos. 4,248,932, and 5,077,117.

Alternatively, a magnetic layer may be applied to the reflective layers of the retroreflective element. The retroreflective element may then be applied to a patterned base sheet in the presence of a magnetic field to help orient the retroreflective element.

Road binders used for pavement marking articles are known in the art. Suitable road binder materials include, but are not limited to, wet paint, thermoset materials, or hot thermoplastic materials (e.g., U.S. Pat. Nos. 3,849,351, 3,891,451, 3,935,158, 2,043,414, 2,440,584, 4,203,878, 5,478,596). Typically, retroreflective elements and skid-resistant particles are sprinkled or otherwise applied to a road binder material while it is in a liquid state. The retroreflective elements or skid-resistant particles become partially embedded in the road binder material while it is liquid. The road binder material subsequently solidifies to hold the retroreflective elements and skid-resistant particles in preferably a partially embedded and partially protruding orientation. The binder can be formed from a durable two component systems such as epoxies or polyurethanes, or from thermoplastic polyurethanes, alkyds, acrylics, polyesters, and the like.

The inventive article contains at least two sets of optical elements: a first set and a second set. The optical elements are exposed-lens having an exposed portion and an embedded portion (also referred to as the "back surface"). Preferably, the optical elements are light transmissible. They can be treated with various surface treatments. For example, the elements may be treated with a coating, such as a silane, to enhance the adhesion of the elements to the spacing layer or the reflective layer and to aid in their handling during processing. Also, low adhesion materials may be present on the exposed portion of the elements to allow for easy roll-up and unwinding of the inventive article.

Initially, the first set of optical elements has a first reflective layer that covers substantially the entire surface of the elements. As used herein, the term "covers substantially" means that the reflective layer covers almost all of the exposed surface of the element but some minute amount of the surface area, on the order of pinholes or slightly larger, may not be covered by a reflective layer due possibly to process limitations. Typically, the reflective layer is immediately adjacent to the surface of the first set of optical elements, although as described above, a thin silane coating or other surface treatment coating may lie between them. A vapor deposition process is typically used to apply the reflective layer, although other methods can be used.

Portions of the first reflective layer are removed from the first set of optical elements with further processing, e.g., by an etching process. Typically, a continuous portion of the first reflective layer is removed. Preferably 20% to 80% of the first reflective layer is removed. More preferably, about 40% to 60% of the first reflective layer is removed to yield optical elements that have the first reflective layer adjacent to the elements' embedded portion. The embedded portions of the first set of optical elements now include the first reflective layer.

In use, the first set of optical element has an exposed surface, with no reflective layer thereon, that acts as a lens to gather incident light. Due to the difference in refractive index between air and the first set of optical elements, the incident light is refracted towards the first reflective layer. The first reflective layer reflects the incident light into the optical element. The incident light then travels through and exits the element as retroreflected light. When the first reflective layer is nearly immediately adjacent to the embedded portion of the first set of optical elements and when an appropriate refractive index is selected for the first set of optical elements, the elements contribute substantially to dry retroreflection.

The second set of optical elements has similar physical properties as the first set. The physical properties include, but are not limited to, refractive index, average diameter, shape, and composition. The second set, however, does not contain a reflective layer immediately adjacent to their back surface. There exists, however, a second reflective layer behind the spacing layer.

Typically, for optimal retroreflective performance, the optical elements have a refractive index ranging from about 1.70 to about 2.20, preferably ranging from about 1.8 to about 2.1. In a preferred embodiment, the first set and the second set have similar refractive index, preferably in the range of about 1.86 to about 2.00. It is within the practice of this invention, however, to select a refractive index range for the first set that differs from the refractive index range for the second set or any additional set of optical elements. In another inventive embodiment, the first set of optical elements has a refractive index in the range of about 1.86 to about 2.00 for optimal dry retroreflectivity and the second set has a refractive index in the range of about 1.90 to about 2.10 for optimal wet retroreflectivity.

Generally, the optical elements, being nearly spherical in shape, have average diameters of about 50 to about 1000 micrometers. Preferably, the elements have average diameters of about 50 to about 500 micrometers, and more preferably from about 75 to 250 micrometers. The first, second, and any subsequent sets of optical elements have similar average diameter thereby reducing segregation of the elements during processing and reducing settling of the elements during storage. It has been found that one set of optical elements can have an average diameter about 50% larger than the diameter of the other set and yet not segregate during processing or storage. Thus, as used in this document "similar average diameters" between the different set of optical elements mean that one set can be at most 50% larger than another set.

The optical elements comprise an amorphous phase, a crystalline phase, or a combination, as desired. The optical elements preferably comprise inorganic materials that are not readily susceptible to abrasion. Suitable optical elements include, for example, microspheres formed of glass such as soda-lime-silicate glasses. Typically, the optical elements have a specific gravity in the range of about 4.0 to 4.5.

Microcrystalline ceramic optical elements as disclosed in U.S. Pat. Nos. 3,709,706; 4,166,147; 4,564,556; 4,758,469; and 4,772,511 have enhanced durability. Preferred ceramic optical elements are disclosed in U.S. Pat. Nos. 4,564,556, 4,772,511 and 4,758,469. These optical elements are resistant to scratching and chipping, and are relatively hard (above 700 Knoop hardness). These ceramic optical elements may comprise zirconia, alumina, silica, titania, and mixtures thereof.

The optical elements can be colored to retroreflect a variety of colors. Techniques to prepare colored ceramic optical elements that can be used herein are described in U.S. Pat. No. 4,564,556. Colorants such as ferric nitrate (for red or orange) may be added in an amount of about 1 to about 5 weight percent of the total metal oxide present. Color may also be imparted by the interaction of two compounds under certain processing conditions (e.g., $TiO_2$ and $ZrO_2$ may interact to produce a yellow color). The optical elements may be colored so that, e.g. colorless, yellow, orange, or some other color of light is retroreflected at night.

The optical elements are typically partially embedded in the spacing layer in a hexagonal close-packed arrangement for optimal retroreflective efficiency. In certain product applications, it may be advantageous to have the optical elements applied at less than the hexagonal close-packed rate.

The pavement markings of the present invention comprise a spacing layer. In general, the spacing layer "cups" the embedded portion of the optical elements. Preferably the spacing layer has approximately the same thickness throughout the inventive article. The spacing layer comprises two major surfaces. The first major surface lies adjacent to the embedded portion of the optical elements. The second major surface has a second reflective layer lying adjacent to it. The spacing layer has a radius of curvature that is larger than the radius of curvature of the optical element. The radius of curvature of the spacing layer has an origin approximately at the center of the optical element. Preferably the radius of curvature is such that the spacing layer forms a concentric hemisphere with respect to the optical element, thereby forming the "cup."

The spacing layer is continuous layer with a controlled thickness, as described below. Unlike the intermediate layer of U.S. Pat. No. 5,812,317, the spacing layer of the present invention is of finite thickness at the most embedded portion of the optical elements 22 of FIG. 1. The requirement that the spacing layer be of a finite, controlled thickness ensures that under wet conditions, the second reflective layer lies at or near the focal point of second set of optical elements so as to allow for retroreflection of incident light.

The spacing layer can be applied to the optical elements using various techniques, including, but not limited to, solution coating, curtain coating, extrusion, lamination, and powder coating. Useful methods that can be used to process the spacing layer into a cup may include, but is not limited to, solvent evaporation, sagging of the spacing layer under the forces of gravity, displacement of the spacing layer due to fluid forces, or electrostatic deposition. Solidification of the spacing layer can include, but is not limited to, drying, chemical reaction, temporary ionic bonds, or cooling.

Generally, the spacing layer is comprised of polyvinyl butyral, polyurethanes, polyesters, acrylics, acid olefin copolymers such as ethylene acrylic acid, ethyl methacrylic acid, and acid olefin copolymers neutralized with a base ionomers, polyvinyl chloride and its copolymers, epoxies, polycarbonates, and mixtures thereof.

When selecting polymer systems for the spacing layer, optical transparency is a requirement, i.e. the spacing layer is light transmissible. The refractive index of the spacing layer generally ranges from about 1.4 to about 1.7, preferably from about 1.4 to about 1.6, and more preferably from about 1.45 to about 1.55.

Various additives such as, but not limited to, stabilizers, colorants, ultraviolet absorbers, antioxidants can be added to the spacing layer to affect the processing, weather durability, or retroreflective color.

The thickness of the spacing layer varies with the refractive index and the size of the optical elements. In a preferred embodiment, the spacing layer thickness depends upon the refractive index and size of the second set of optical elements. Generally, for an optical element having a given refractive index and a given size (i.e., average diameter), the thicker the spacing layer, the better the retroreflective performance of the article under wet conditions. There is, however, an upper limit of the spacing layer thickness for wet retroreflectivity. Typically, the relative thickness of the spacing layer to the radius of the optical element ranges from about 0.05 to about 1.4, preferably from about 0.1 to about 0.9, and more preferably from about 0.2 to about 0.9.

For wet retroreflectivity, the optimal spacing layer thickness relative to the average radius of the optical element (for a refractive index ranging from about 1.7 to about 2.4) is given by the formula for a 1.5 refractive index spacing layer: (spacing layer thickness/optical element radius)=exp[−3.99×(optical element refractive index+7.20)]. The suitable range of the relative spacing layer thickness is about ±0.20 for low refractive index (i.e., 1.7 index) optical elements and about ±0.1 for high refractive index (i.e., 2.4 index) optical elements. It is believed that under wet conditions, water (having a refractive index of about 1.33) lying on top of the second set of optical elements, aids in retroreflective performance of the inventive article. It is believed that water adjusts the focal length of the second set of optical elements so as to refract incident light at or near the second reflective layer.

For other refractive indices for the spacing layer, some variation in the above equations will result. In general, lower refractive index spacing layers will lead to a decreased spacing layer thickness; higher refractive index spacing layers will lead to an increased spacing layer thickness; and thinner spacing layers will generally yield an enhanced retroreflective angularity of the exposed-lens article.

The reflective layer may comprise either a diffuse reflector or a specular reflector. The diffuse reflector typically comprises a diffuse pigment. Examples of useful diffuse pigments include, but are not limited to, titanium dioxide, zinc oxide, zinc sulfide, lithophone, zirconium silicate, zirconium oxide, natural and synthetic barium sulfates, and combinations thereof. The diffuse pigment is typically delivered to the back (i.e., the second surface) of the spacing layer via a polymeric coating. The polymeric coating may be applied using a variety of techniques such as knife coating, roll coating, extrusion, or powder coating.

The specular reflector may be a specular pigment, a thin metal layer (often referred to as a "metallized layer"), or multi-layered dielectric materials. An example of a useful specular pigment is a pearlescent pigment. Useful pearlescent pigments include, but are not limited to, AFFLAIR™ 9103 and 9119 (obtained from EM Industries, Inc., New York, USA), Mearlin Fine Pearl #139V and Bright Silver #139Z (obtained from The Mearl Corporation, Briarcliff Manor, N.Y., USA).

The reflective layer may also comprise thin metallic films. These thin metallic films may be applied by precipitation (e.g., precipitation of silver nitrate), thermal evaporation in a vacuum (e.g., resistive heating of Ag, Al; exploding wire; laser evaporation; and the like), sputtering (e.g., glow discharge) and chemical methods (e.g., electrodeposition, chemical vapor deposition). Resistive heating of aluminum is the presently preferred method of coating thin metallic films to the spacing layer.

Another suitable reflective layer includes multi-quarter wavelength layers of various dielectric materials. A large number of stacks of high and low refractive index films can yield retroreflective performance very close to 100 percent. The multilayer thin films can be applied by thermal evaporation and chemical methods.

Figure 4A:
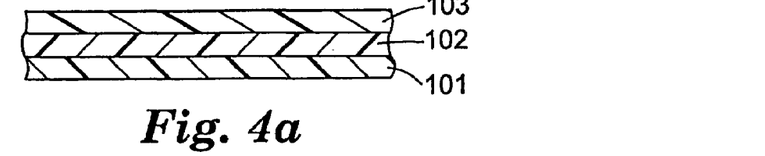
FIGS. 4a to 4c are schematic views of various stages in a process of making a retroreflective article in accordance with the invention.
Figure 4B:
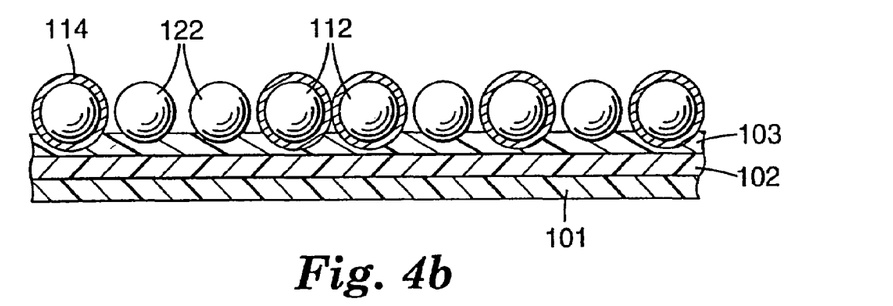
Figure 4C:
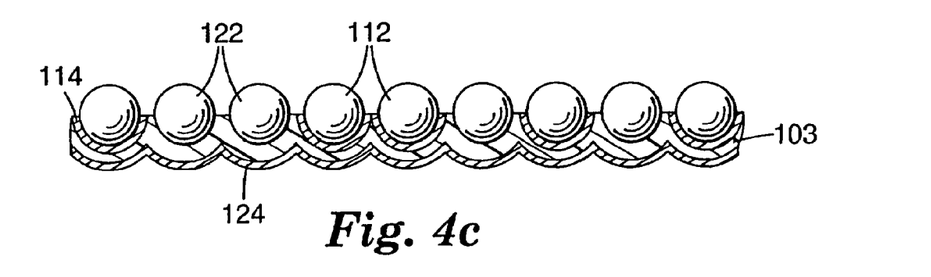

FIGS. 4a to 4c show various stages of an illustrative method of the invention. The inventive article can be made by first coating a cupping resin onto a liner such as polyethylene terephthalate (PET), paper, or the like. (See for example, U.S. Pat. No. 4,505,967(Bailey) column 4, line 63). Suitable cupping resins include resins which have lower viscosity than the spacing layer at the process temperature and which also exhibit low adhesion to the spacing layer (e.g., Vitel™ 3300 resin available from Bostik, Middleton, Mass.). The cupping resin (generally about 0.05 to 0.25 millimeters thick) can be placed on the liner (generally about 0.01 to 0.10 millimeters thick) by methods such as, bar coating and forced air drying, extrusion, or hot melt coating. After drying, the cupping film, which comprises the liner and the cupping resin layer, can be wound up.

The spacing layer can be coated (e.g., extruded, solution coated, powder coated) on the cupping film forming a composite. As shown in FIG. 4a, the spacing layer is disposed on the cupping resin layer. The spacing layer may comprise, for example Primacor™ 3440, (an extrusion grade thermoplastic, high molecular weight copolymer believed to comprise a major portion of ethylene monomer and a minor portion of acrylic acid monomer, available from Dow Chemical Co. Midland, Mich., USA, having a melt flow index of about 10), a weather stabilizing system, and an antioxidant. Preferably, spacing layer is a previously extruded, light-transmissible polymer that is laminated to the cupping film, although the spacing layer can be extruded directly on to the cupping film. This composite spacing layer, which is shown in FIG. 4a to comprise a liner 101 has, on one of its surfaces, a cupping resin layer 102, and a spacing layer 103, can be wound up, if desired.

In FIG. 4b, a first set of optical elements 112 has a first reflective layer 114 that covers substantially the entire surface of element 112. In one method, the reflective layer is applied to the elements 112 by vapor deposition processes. The first set is mixed with a second set of optical elements 122 and cascaded on to the exposed surface of the spacing layer, which, preferably, has been previously softened so as to be receptive to the optical elements. The elements are allowed to sink into the spacing layer 103 so that about 20% of the optical elements' diameter lie in the spacing layer.

In FIG. 4c, the optical elements 112 and 122 have been further embedded into the spacing layer such that about 50% of the element's diameter is exposed. The spacing layer has been processed so that it cups around the embedded portion of the optical elements. As shown, the first set of optical elements has had a portion of the first reflective layer removed from the exposed portion. The first reflective layer has been removed by, for example, an etching process. When the first reflective layer is aluminum, a convenient etching medium is sodium hydroxide, at a concentration of about one molar (1 M). The cupping film has been removed and a second reflective layer 124 has been applied to the second surface of the spacing layer. The second reflective layer functions as the reflector for the second set of optical elements 122. When water covers the second set of optical elements, the spacing layer is of sufficient thickness and of appropriate refractive index relative to the refractive index of the second set so as to allow incident light to focus at or near the layer 124. If desired, an adhesive layer or a tie layer can be applied to the exposed surface of the second reflective layer 124 to allow for attachment to a substrate, such as, a patterned base sheet, a core element, or a roughened pavement surface.

In an alternative method, the spacing layer can be applied on to the optical elements. Several polymer-processing techniques are useful. When the optical elements have an average diameter less than about 100 microns, knife coating a polymeric solution on top of an optical element film will result in an adequately cupped spacing layer.

For larger optical elements, powder coating produces a spacing layer having uniform thickness on the optical elements. In one example of powder coating, a polymer is made or ground to about 30-micron mean particle size. The powder is fluidized and conveyed with compressed air to an electrostatic spray gun where the powder is charged by corona or triboelectric methods. The powder is then sprayed towards the optical elements which is over a conductive substrate or base plate that is maintained at electrical ground. When the charged powder comes close to the grounded optical elements, the powder particles adhere due to electrostatic attraction. The dynamics of the electrostatic attraction are such that the powder tends to collect at a uniform thickness over the three dimensional optical elements. The powder coated optical elements is then passed through an oven to fuse the powder onto the substrate. Various fluidized bed powdercoating techniques can alternatively be used to deliver a uniform thickness of powder over the optical elements prior to the powder fusing operation. Further processing may then take place.

Different colors can be achieved under wet and/or dry conditions by use of various colors in the optical elements layer and/or spacing layer.

EXAMPLES

The following examples further illustrate various specific features, advantages, and other details of the invention. The particular materials and amounts recited in these examples, as well as other conditions and details, should not be construed in a manner that would unduly limit the scope of this invention. Percentages given are by weight, unless otherwise specified.

Retroreflective Measurements

The coefficient of retroreflection ($R_A$) measurement, in candella per lux per square meter ($cd/lux/m^2$), was obtained for some samples by following Procedure B of ASTM Standard E 809-94a with an entrance angle of −4.0 degrees and an observation angle of 0.2 degrees. The photometer used for this measurement is described in U.S. Defensive Publication No. T987,003. A "Wet $R_A$" measurement was taken while the sample was immersed under water such that the distance between the water surface and the most exposed portion of the optical elements was on the order of about 5 millimeters.

The coefficient of retroreflected luminance ($R_L$) measurement, in millicandella per square meter per lux was obtained for some samples as follows. The $R_L$ measurement taken at a geometry that approximates an automobile located 30 meters away from the sample. The pavement marking samples to be measured were placed on a table in a dark room. Above the samples was a plumbing system capable of delivering an artificial rainfall at a uniform rate of about 10 cm per hour.

The samples were illuminated with a Model RS-50 lamp (which provides the light source) equipped with a RS-2 power supply, both commercially available from Gamma Scientific Inc., San Diego, Calif., USA. The height of the lamp was adjusted to obtain an entrance angle of about 88.8 degrees and was placed about 5 meters from the sample. A IL Model 1700 Research Radiometer, commercially available from International Light, Inc., Newburyport, Mass., USA, was used to measure the illuminance on the sample.

A Model 2009 Auto-Telephotometer, commercially available from Gamma Scientific, Inc., was placed about 5 meters from the sample and nearly immediately above the lamp. The height of the telephotometer was adjusted to obtain an observation angle of about 1.05 degrees. The telephotometer was used to measure the luminance of a sample. The luminance was multiplied by a conversion factor to obtain luminance with units of candellas per square meter ($cd/m^2$). The $R_L$ value was calculated by dividing the luminance by the illuminance. The samples were measured under dry and under simulated rainfall conditions.

Examples 1 to 5

Five different samples were made in substantially the same way, as described below, to study the effect that the different sets of optical elements may have on retroreflective performance of the inventive article.

Various methods of manufacturing 1.91 ceramic optical elements are available, such as that described in Example 1 of U.S. Pat. No. 4,772,511, as modified herein. In that example, about 90 grams of aqueous colloidal silica sol, while being rapidly stirred, was acidified by the addition of about 0.75 milliliter concentrated nitric acid. The acidified colloidal silica was added to 320 grams of rapidly stirring zirconyl acetate solution. About 52 grams of Niacet aluminum formoacetate (33.4% fired solids) were mixed in 300 milliliters de-ionized water and dissolved by heating to 80° C. The solution, when cooled, was mixed with the zirconyl acetate-silica mixture described previously. The resulting mixture was concentrated by rotoevaporation to 35% fired solids. The concentrated optical element precursor solution was added drop-wise to stirred, hot (88° to 90° C.) peanut oil. The precursor droplets were reduced in size by the agitation of the oil and gelled.

Agitation was continued in order to suspend most of the resulting gelled droplets in the oil. After about one hour, agitation was stopped and the gelled microspheres were separated by filtration. The recovered gelled microspheres were dried in an oven for about 5 hours at about 78° C. prior to firing. The dried microspheres were placed in a quartz dish and fired in air by raising the furnace temperature slowly to about 900° C. over 10 hours, maintaining about 900° C. for 1 hour, and cooling the microspheres with the furnace. The initial firing of all the samples was done in a box furnace with the door slightly open. The optical element constituents were in the molar ration of $ZrO_2:Al_2O_3:SiO_2$ of 3:00:1.00:0.81. On average, the optical elements were about 165 micrometer in diameter.

A first set of optical elements was made by taking 4800 grams of the 1.91 refractive index ceramic elements described above and depositing a first aluminum reflective layer to substantially cover the entire surface area of the elements. The aluminum reflective layer was deposited using essentially the same method as taught in U.S. Pat. No. 4,618,525 (Chamberlain et al.) where the optical elements were tumbled in a vacuum chamber while being sputter-coated with a vapor of aluminum for about 360 minutes at an applied power of about 3.2 kilowatts. The sputter cathode was a water-cooled rectangular target of about 12.7 by 20.3 centimeter in size. The direct current planar magnetron method was used. The argon sputtering gas pressure was about 0.53 Pascal and the background pressure was about $1.6 \times 10^{-3}$ Pascal. The first aluminum reflective layer was about 80 nanometers thick.

The first set was mixed with a second set of optical elements in various combinations as shown in Table 1. The second set of optical elements were the 1.91 index ceramic elements described above, without any reflective layer thereon.

A composite was made by extruding a 0.089 mm (0.0035 inch) ethylene acrylic acid (EAA) spacing layer on to a 0.061 mm (0:0024 inch) polyester liner. The first surface of the spacing layer was exposed to the atmosphere and the second surface was in contact with the polyester liner. The spacing layer was made using conventional extrusion method with Primacor™ 3440 EAA having a melt index of 10 (commercially available from Dow Chemical Co., Midland, Mich., USA). In preparation for partially embedding the elements, the composite was preheated on a hot plate, set at a temperature of about 204° C. (400° F.), with the polyester side in contact with the hot plate. The preheating step made the spacing layer soft and tacky.

Each mixture of optical elements was sprinkled, by hand, onto the spacing layer. A hand roller was used to press the elements into the spacing layer. The composite, with elements thereon, was kept on the hot plate for about 30 seconds to allow for additional sinking of the elements into the spacing layer. The sample was removed from the hot plate and the excess optical elements were collected and removed. The polyester liner was then removed. The sample was again placed on the hot plate for about five minutes such that the optical elements were in contact with the heating surface. This heating action allowed the spacing layer to cup around the elements. The sample was removed from the hotplate and cooled in a water bath at a temperature of about 24° C. (75° F.). The first set of optical elements, if present in the sample, had the first reflective layer coating the elements' entire surface. About half of these elements' diameter were exposed to the atmosphere while the other half was embedded in the spacing layer.

The exposed reflective layer of the first set was etched away by submerging the sample in a one molar (1 M) solution of sodium hydroxide for about 10 seconds. The sample was rinsed using tap water to remove the sodium hydroxide.

On the second surface of the spacing layer, a second reflective layer of aluminum was deposited using an electron beam vacuum coater pulling a vacuum at about $8 \times 10^{-4}$ Pascal and an evaporation rate of about 1.8 to 2.4 nanometers per second. The second reflective layer was about 90 nanometers thick. The vacuum coater used was a CHA Industries Mark 50 model (commercially available from CHA Industries, Freemont, Calif., USA). The coefficient of retroreflection ($R_A$) for each sample under dry and wet conditions were measured at −4.0 entrance angle, 0.2 observation angle, and reported in Table 1 along with the error for each measurement. It was observed that the packing of the optical elements was not optimal, meaning that the elements were not packed in a hexagonal arrangement.

TABLE 1

Retroreflective Values for Various Samples

| Example | Amount of First Set | Amount of Second Set | Average Dry $R_A$ | Average Wet $R_A$ |
|---|---|---|---|---|
| 1 | 0% | 100% | 2.6 ± 0.1 | 95 ± 20 |
| 2 | 25% | 75% | 20 ± 4 | 55 ± 13 |
| 3 | 50% | 50% | 36 ± 1 | 50 ± 11 |
| 4 | 75% | 25% | 55 ± 1 | 36 ± 4 |
| 5 | 100% | 0% | 87 ± 6 | 0.40 ± 0.04 |

Example 6

A pavement marking was made as follows. A first polyester liner, about 0.05 millimeter (mm) (0.002 inch) thick, was coated with a polyester resin (Vitel™ 3301, commercially available from Bostik Co., Middleton, Mass., USA) using a notch bar coater. The polyester resin served as the cupping resin. The notch bar was set at a gap of about 0.25 mm (0.010 inch). The coated liner was sent to a series of ovens set at about 38° C. to 93° C. (100 to 200° F.) to dry the resin yielding a first composite film. The dried thickness of the polyester resin of the first composite film was about 0.09 mm (0.0025 inch).

A spacing layer, about 0.97 mm (0.038 inch) thick, was extruded on to a second polyester liner about 0.05 mm (0.002 inch) thick. The spacing layer was Primacor™ 3440 (commercially available from Dow Chemical Co., Midland, Mich., USA).

The spacing layer was laminated to the first composite film such that the spacing layer was in contact with the Vitel™ polyester resin. The second polyester liner for the spacing layer was removed to yield a second composite comprising: a first polyester liner, a polyester resin (Vitel™ 3301), and the spacing layer (Primacor™ 3440).

The second composite was passed over a first steel roll heated to a temperature of about 125° C. (257° F.) such that the polyester liner was in direct contact with the surface of the steel roll. While on the first steel roll, the second composite, with the spacing layer exposed was brought into contact with a bed of optical elements containing approximately 50% by weight of the first set of optical elements and 50% by weight of the second set of optical elements, as described in Example 3. This step produces a third composite comprising the second composite having the optical elements partially embedded in the spacing layer. The elements had about 20% of their diameters embedded in the spacing layer.

The third composite was passed over a second steel roll having a diameter of about 0.6 meter (2 ft) heated to a temperature of about 138° C. (280° F.) such that the first polyester liner was in direct contact with the surface of the second steel roll. The third composite was moving at a web speed of about 3 meters per minute. After the third composite has traveled about half the circumference of the second steel roll, a rubber roll was used to further embed the optical elements into the composite. The rubber roll created a nip with the second steel roll. The optical elements were in direct contact with the rubber roll and the first polyester liner was in direct contact with the second steel roll. Approximately 60% of optical element's diameter was embedded in the spacing layer.

The third composite was then passed through a one molar (1 M) aqueous solution of sodium hydroxide for about 30 seconds to remove the aluminum reflective layer present on the first set of optical elements. The third composite was rinsed with water.

The first polyester liner and the Vitel™ 3301 polyester resin were removed from the third composite. On the exposed surface of the spacing layer, a second aluminum reflective layer, about 90 nanometers thick, was deposited using an electron beam vacuum coater.

A pressure sensitive adhesive (PSA) layer with a liner was laminated to the second aluminum layer such that the PSA was in direct contact with the aluminum. The PSA liner was removed and the sample was laminated to Lexan™ (plexiglass) pieces having dimensions of about 10 cm in length, about 0.64 cm in width, and 3.0 mm in height to yield retroreflective strips. The strips were then laminated to an aluminum panel having dimensions of about 1.5 meters in length, about 10 cm in width, and about 1.5 mm in height. The strips were spaced about 8.9 centimeters apart to minimize shadowing effects one strip may have on another. The retroreflective performance of the sample, in terms of coefficient of retroreflected luminance ($R_L$) was measured to be 16,000 mcd/m$^2$/lux under dry conditions and 3,200 mcd/m$^2$/lux under simulated rainfall conditions.

Example 6A (Comparative)

A piece of 3M™ Stamark™ High Performance Tape Series 380I (commercially available from 3M, St. Paul, Minn., USA) was laminated to an aluminum panel as in Example 6. The retroreflective performance of the sample, in terms of coefficient of retroreflected luminance ($R_L$) was measured to be 880 mcd/m$^2$/lux under dry conditions and 95 mcd/m$^2$/lux under simulated rainfall conditions.

All references cited above, including patents discussed in the Background, are incorporated by reference in their entirety into this document.

The present invention may be suitably practiced in the absence of any element or item not specifically described in this document.

What is claimed is:

1. A retroreflective article comprising:
   (a) a layer of optical elements comprising:
      (i) a first set of exposed-lens optical elements having an embedded portion and a first reflective layer disposed on the embedded portion; and
      (ii) a second set of exposed-lens optical elements having an embedded portion;
   (b) a light-transmissible spacing layer having first and second surfaces, the first surface disposed adjacent to the embedded portions of the first set and second set of optical elements; and
   (c) a second reflective layer disposed on the second surface of the spacing layer.

2. The article of claim 1, wherein the first and second set of optical elements have similar average properties selected from the group consisting of average diameter, refractive index, specific gravity, and combinations thereof.

3. The article of claim 2, wherein the refractive index of the first and second sets of optical elements are in the range of about 1.86 to about 2.0.

4. The article of claim 1, wherein the first set of optical elements has a refractive index in the range of about 1.86 to 2.0 and the second set of optical elements has a refractive index of about 1.90 to 2.4.

5. The article of claim 1 wherein the spacing layer cups around the first and second set of optical elements.

6. The article of claim 1, wherein the spacing layer has a refractive index in the range of about 1.4 to 1.7.

7. The article of claim 1, wherein the first and second set of optical elements are ceramic.

8. The article of claim 1, wherein the first set of optical elements contributes substantially to retroreflection under dry conditions and the second set of optical elements contributes substantially to retroreflection under wet conditions.

9. The article of claim 1, wherein the optical elements from the first set are evenly distributed with the optical elements from the second set.

10. The article of claim 1, wherein the first and second reflective layers are metal layers selected from the group consisting of aluminum and silver.

11. The article of claim 1, wherein the second reflective layer is selected from the group consisting of diffuse reflector and specular reflector.

12. The article of claim 1, wherein a light transmissible colorant resides in at least one layer selected from the group consisting of the first set of optical elements, the second set of optical elements, and the spacing layer.

13. The article of claim 1, wherein the spacing layer has a uniform and finite thickness at the most embedded portion of the optical elements.

14. The article of claim 1, wherein the spacing layer comprises material selected from the group consisting of polyvinyl butyral, polyurethane, polyester, acrylic, acid olefin copolymers, polyvinyl chloride and its copolymers, epoxy, polycarbonate, and mixtures thereof.

15. A pavement marking comprising:
   (a) a binder layer;
   (b) a plurality of non-integral projections disposed on the binder layer; and
   (c) the retroreflective article of claim 1 disposed on the projections.

16. The pavement marking of claim 15 further comprising a base sheet beneath the binder layer.

17. The pavement marking of claim 15, wherein the binder layer further comprises pigments and exposed-lens optical elements partially embedded in the pigmented binder.

18. A retroreflective element comprising:
   (a) a core layer;
   (b) the retroreflective article of claim 1 disposed on the core such that the core lies adjacent to the second reflective layer.

19. A pavement marking comprising:
(a) a binder layer; and
(b) the retroreflective element of claim 18 disposed on the binder layer.

20. The article of claim 1, wherein the optical elements are applied selectively so as to produce graphics or indicia.

21. The article of claim 1, wherein the article retroreflects a first color under dry conditions and a second color under wet conditions.

22. A method of making a pavement marking comprising the steps of:
(a) providing a first set of optical elements having a first reflective layer that covers substantially the entire surface of the elements;
(b) providing a second set of optical elements;
(c) providing a light-transmissible spacing layer having a first and a second surface;
(d) applying the first and the second sets of optical elements to the first surface of the spacing layer;
(e) partially embedding the first and second sets of optical elements into the spacing layer such that the optical elements have exposed portion and an embedded portion;
(f) removing the first reflective layer from the exposed portion of the first set of optical elements; and
(g) applying a second reflective layer to the second surface of the spacing layer.

* * * * *

UNITED STATES PATENT AND TRADEMARK OFFICE
CERTIFICATE OF CORRECTION

PATENT NO. : 6,966,660 B1
DATED : November 22, 2005
INVENTOR(S) : Buccellato et al.

It is certified that error appears in the above-identified patent and that said Letters Patent is hereby corrected as shown below:

Column 3,
Line 30, after "indicia" insert -- . --.

Column 4,
Line 13, after "has" delete "a." and insert -- a --.
Line 52, delete "integrals art" and insert -- integral part --.

Signed and Sealed this

Seventh Day of February, 2006

JON W. DUDAS
*Director of the United States Patent and Trademark Office*